US 10,746,860 B2

United States Patent
Calmettes et al.

(10) Patent No.: US 10,746,860 B2
(45) Date of Patent: Aug. 18, 2020

(54) METHOD FOR DETECTING A TARGET BY GNSS REFLECTOMETRY AND ASSOCIATED SYSTEM

(71) Applicant: THALES, Courbevoie (FR)

(72) Inventors: Thibaud Calmettes, Toulouse (FR); Guillaume Carrie, Toulouse (FR); Michel Monnerat, Toulouse (FR)

(73) Assignee: THALES, Courbevoie (FR)

( * ) Notice: Subject to any disclaimer, the term of this patent is extended or adjusted under 35 U.S.C. 154(b) by 129 days.

(21) Appl. No.: 16/173,428

(22) Filed: Oct. 29, 2018

(65) Prior Publication Data

US 2019/0137614 A1    May 9, 2019

(30) Foreign Application Priority Data

Nov. 7, 2017    (FR) ..................... 17 01143

(51) Int. Cl.
| | |
|---|---|
| *G01S 13/00* | (2006.01) |
| *G01S 13/48* | (2006.01) |
| *G01S 13/87* | (2006.01) |
| *G01S 7/41* | (2006.01) |
| *G01S 13/04* | (2006.01) |
| *G01S 13/02* | (2006.01) |

(52) U.S. Cl.
CPC ............. *G01S 13/003* (2013.01); *G01S 7/411* (2013.01); *G01S 13/04* (2013.01); *G01S 13/48* (2013.01); *G01S 13/878* (2013.01); *G01S 2013/0245* (2013.01)

(58) Field of Classification Search
CPC .......... G01S 13/00; G01S 13/04; G01S 13/48; G01S 13/878; G01S 19/14
See application file for complete search history.

(56) References Cited

U.S. PATENT DOCUMENTS

| | | | | |
|---|---|---|---|---|
| 2010/0007547 | A1* | 1/2010 | D'Addio | ............... G01S 13/003 342/120 |
| 2017/0343485 | A1* | 11/2017 | Garrison | ............... G01S 13/003 |

FOREIGN PATENT DOCUMENTS

FR    2 972 806 A1    9/2012

OTHER PUBLICATIONS

Unwin, et al., "Implementing GNSS-Reflectometry in Space on the TechDemoSat-1 Mission", Proceedings of the 27th International Technical Meeting of the Satellite Division of the Institute of Navigation (ION GNSS+ 2014), pp. 1222-1235, Sep. 12, 2014.

(Continued)

*Primary Examiner* — Bernarr E Gregory
*Assistant Examiner* — Fred H Mull
(74) *Attorney, Agent, or Firm* — Baker & Hostetler LLP

(57) ABSTRACT

An iterative method for detecting is provided, with at least one receiver satellite in orbit, a target possessing reflective properties that are different from those of the area in which the target is found, by GNSS reflectometry, wherein the reflected GNSS signals are received by an active antenna of the receiver satellite comprising a plurality of antenna elements, the method comprising a step of determining assumed positions of the target, for which positions it is desired to detect the target, and, forming beams and tracking GNSS signals in accordance with these assumptions.

7 Claims, 1 Drawing Sheet

(56) References Cited

OTHER PUBLICATIONS

Brown, et al., "Remote sensing using bistatic GPS and a digital beam-steering receiver", GNSS 2005, Proceedings of the 18th International Technical Meeting of the Satellite Division of the Institute of Navigation (ION GNSS 2005), pp. 2511-2516, Sep. 16, 2005.

Brown, et al., "Test Results from a Novel Passive Bistatic GPS Radar Using a Phased Sensor Array", Proceedings of ION NTM 2007, pp. 504-509, Jan. 24, 2007.

* cited by examiner

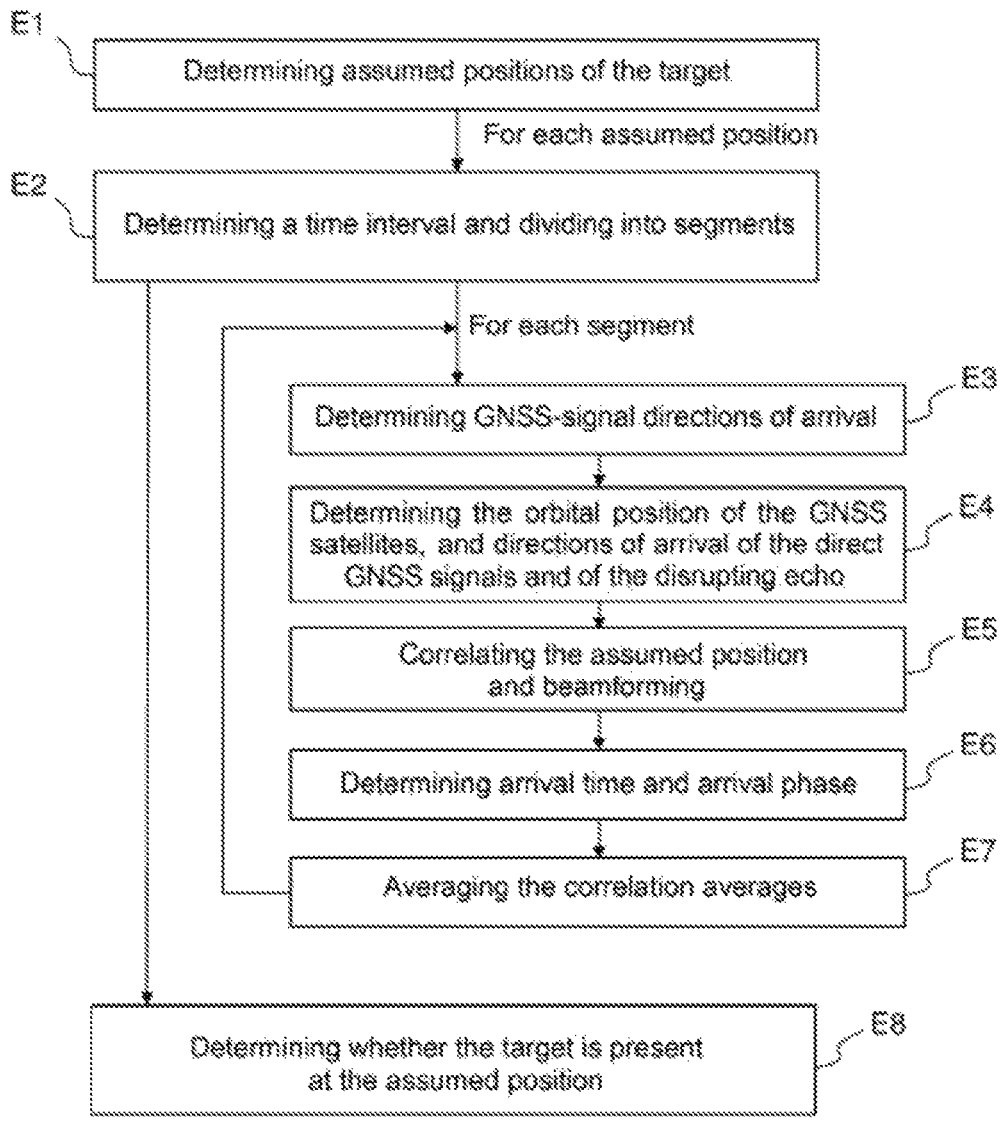

METHOD FOR DETECTING A TARGET BY GNSS REFLECTOMETRY AND ASSOCIATED SYSTEM

CROSS-REFERENCE TO RELATED APPLICATIONS

This application claims priority to foreign French patent application No. FR 1701143, filed on Nov. 7, 2017, the disclosure of which is incorporated by reference in its entirety.

FIELD OF THE INVENTION

The invention relates to a method for detecting a target by GNSS reflectometry.

BACKGROUND

The term "target" is understood to mean an element possessing reflective properties that are different from those of the area in which it is found. These different reflective properties may be due, nonlimitingly, to a different geometry (e.g. ice peak in a flat extent of ice) or a different composition (e.g. metal structure on a body of water).

The reflective properties may be of specular or diffuse type, or any combination thereof.

GNSS reflectometry is an original and opportunistic remote sensing technique that consists in analysing the electromagnetic waves continuously emitted by the sixty satellites of GNSS positioning systems (GALILEO, GPS, GLONASS, etc.), which are captured by an antenna after reflection from the surface of the Earth. These signals interact with the reflecting area and therefore contain information on its properties, which may be observed in the signal received after reflection. Although the feasibility and advantageousness of this method have been amply demonstrated, in particular in aeronautical fields, the implementation of this technique poses a certain number of problems in a spatial context.

The GNSS is therefore used as a radar, and receives the echo after reflection from the surface of the Earth, and deduces, by analysis of the echo, the properties of this surface.

It is an advantageous alternative to radar, at least for low-cost applications, in particular because it is not necessary to pay for the source (the emitter of the radar, with all that it costs in terms of consumption), and it is continuously available (no need to wait for the return of the satellite or of the carrier of the radar).

GNSS reflectometry has been used for a number of years, in an airborne context, for example in agriculture and the surveillance of forests.

However, the link budget is not high enough for implementation of GNSS reflectometry to be simple with conventional low Earth orbit (LEO) satellites, a low Earth orbit generally being considered to be lower than 2000 km.

In the present case, a target may be a ship on the ocean (small area of specular reflection in the middle of an area of diffuse, on the whole, reflection), a portion of a pole not covered with ice (small area of diffuse reflection in the middle of an area of specular, on the whole, reflection).

SUMMARY OF THE INVENTION

One aim of the invention is to overcome the aforementioned problems.

The invention proposes, according to one of its aspects, an iterative method for detecting, with at least one receiver satellite in orbit, a target possessing reflective properties that are different from those of the area in which said target is found, by GNSS reflectometry, wherein the reflected GNSS signals are received by phased-array antenna, hereafter named "active antenna" of the receiver satellite comprising a plurality of antenna elements, the method comprising a step of determining assumed positions of the target, for which positions it is desired to detect the target, and, for each assumed position of the target, carrying out the following steps:

determining a time interval in which said assumed position of the target is
    visible from the receiver satellite, and dividing this time interval into time
    segments, for each of which the following steps are carried out:
        determining the direction of arrival of the reflected GNSS signals issued from said assumed position of the target on the basis of the orbital position of the receiver satellite;
        determining the orbital positions of the GNSS satellites from their ephemeris data, then the directions of arrival of the direct GNSS signals of the GNSS satellites visible to a GNSS receiver of the satellite, and of the disrupting specular-reflection echo of the GNSS signals from the area in which the target is found;
        correlating, for each visible GNSS satellite, the assumed position of the target, in the GNSS code corresponding to this GNSS satellite, and forming beams with the active antenna while maximising the gain of the active antenna in the direction of arrival of the signals issued from the assumed position of the target, and while minimising the gain of the active antenna in the directions of arrival of the direct signals of the GNSS satellites visible to the GNSS receiver and of the disrupting specular-reflection echo from said area in which the target is found;
        determining the expected arrival time and the expected variation as a function of time in the arrival phase of GNSS signals potentially reflected from the target, and averaging, over the visible GNSS satellites, the correlation in the GNSS code for the arrival times and variation as a function of time in the arrival phase, on the basis of the orbital position of said receiver satellite and of its variations and of the orbital positions of the GNSS satellites visible from the assumed position of the target and their variations; and
        averaging, over the time segments, said averages of the correlation over the GNSS satellites; and
        determining whether the target is present at the assumed position by comparing said average over the time segments with a reference value.

Thus, the method makes it possible to be able to use GNSS signals to locate a target.

In one implementation, the orbital position of the receiver satellite is determined on the basis of a GNSS receiver placed on said satellite.

Thus, the satellite not only has a means for determining its position, but also a capacity to collect the GNSS-satellite ephemeris data required by geometric calculations allowing reception geometries and variations as a function of time in characteristics of the received signals to be evaluated.

In one implementation, the reference value of the step of determining whether the target is present is preset.

Thus, it is possible to identify the presence of a particularly reflective (diffuse, respectively) target by observing a high (low, respectively) coherence in the signals received from this direction. This may in particular be useful in an experimental context, or at the start of satellite operation, in order to set the sensitivities of the algorithms on certain known points.

In one implementation, the reference value of the step of determining whether the target is present is adaptive.

Thus, it is possible to adapt the thresholds to the observed environment, for example to define higher detection thresholds in maritime zones containing more ships or boats in order to identify, without confusion, only larger targets, and to return to lower thresholds when detecting smaller targets, when the risk of confusion is lower.

In one embodiment, the target is a ship or boat on a body of water.

As a variant, the target is an area not covered by ice at one of the Earth's poles.

The invention also proposes, according to another of its aspects, a system for detecting, with a satellite in orbit, a target possessing reflective properties that are different from those of the area in which it is found, by GNSS reflectometry, said system being suitable for implementing the method such as described above.

BRIEF DESCRIPTION OF THE DRAWINGS

The invention will be better understood on studying a few embodiments that are described by way of completely nonlimiting example and illustrated by the drawing in the FIGURE schematically illustrates one implementation of the method according to one aspect of the invention.

DETAILED DESCRIPTION

The iterative method for detecting, with at least one receiver satellite in orbit, a target possessing reflective properties that are different from those of the area in which said target is found, by GNSS reflectometry, wherein the reflected GNSS signals are received by an active antenna of the receiver satellite comprising a plurality of antenna elements, the method comprising a step E1 of determining assumed positions of the target, for which positions it is desired to detect the target, and, for each assumed position of the target, carrying out the following steps:

determining E2 a time interval in which said assumed position of the target is visible from the receiver satellite, and dividing this time interval into time segments, for each of which the following steps are carried out:

determining E3 the direction of arrival of the reflected GNSS signals issued from said assumed position of the target on the basis of the orbital position of the receiver satellite;

determining E4 the orbital positions of the GNSS satellites from their ephemeris data, then the directions of arrival of the direct GNSS signals of the GNSS satellites visible to a GNSS receiver of the satellite, and of the disrupting specular-reflection echo of the GNSS signals from the area in which the target is found;

correlating E5, for each visible GNSS satellite, the assumed position of the target, in the GNSS code corresponding to this GNSS satellite, and forming beams with the active antenna while maximising the gain of the active antenna of the receiver satellite in the direction of arrival of the signals issued from the assumed position of the target, and while minimising the gain of the active antenna of the receiver satellite in the directions of arrival of the direct signals of the GNSS satellites visible to the GNSS receiver and of the disrupting specular-reflection echo from said area in which the target is found;

determining E6, at the receiver satellite, the expected arrival time and the expected variation as a function of time in the arrival phase of GNSS signals potentially reflected from the target, and averaging, over the visible GNSS satellites, the correlation in the GNSS code for the arrival times and variation as a function of time in the arrival phase, on the basis of the orbital position of said receiver satellite and of its variations and of the orbital positions of the GNSS satellites visible from the assumed position of the target and their variations; and averaging E7, over the time segments, said averages of the correlation over the GNSS satellites; and determining E8 whether the target is present at the assumed position by comparing said average over the time segments with a reference value.

The present invention is in particular based on the use of an active multiple-beam antenna in the receiver satellite or receiver satellites, in low or LEO orbits. In the case of a plurality of satellites, it is also necessary to manage the communications between the various satellites. Use of a single receiver satellite will therefore be preferred.

The use of an active antenna in particular allows coherent recombination of signals in a determined direction, or direction of a potential target, allowing the gain in this direction to be improved in proportion to the number of antennas used for the recombination of the signals, but also signals to be cancelled out in directions that are judged to be interfering, in particular in the direction of the specular reflection of each GNSS satellite, making it possible to concentrate on the reception of non-specular echoes.

In addition, since these two elements may be implemented dynamically and continuously, and in a way tailored to the relative movements of the GNSS satellites, of the LEO carrier satellite and of the targets (which are assumed to be stationary or slowly moving) on Earth, it is also possible to increase the number of constellations used, the adaptive beam formation also possibly being used to mitigate problems created by the disrupting specular-reflection echo of the GNSS signals from the area in which the target is found, a.k.a. the "near-far" effect, and to increase the durations of (coherent and/or incoherent) integration and therefore once again increase target-detection sensitivity.

The orbital position of the receiver satellite may be determined using the GNSS receiver. A variation in position may be calculated via a time derivative of the position.

The reference value may be preset or adaptive.

The target may be a ship or boat on a body of water or an area that is not covered with ice at one of the Earth's poles.

The principle of the invention is the application of a series of interrelated loops, the inputs of which are the outputs of GNSS correlations and reception:

each position on Earth, defined by a mesh dependent on the GNSS signal of highest resolution (of largest bandwidth):
if it is not visible: nothing
if it becomes visible: start the integration
if it its visibility ends: decision on the presence of a target
if it is still visible:

for each GNSS satellite:
  determining the optimal beamforming allowing pointing toward the reflection, from this source, of the signal emitted by the GNSS satellite, and the removal of sea clutter and of visible satellites liable to create a near-far effect, in an amount of N−2 satellites removed with a number of antennas N
  determining the reception time and frequency expected for such a signal reflected from the target given the position of the target and the positions and speeds of the LEO and GNSS satellites.
  coherently correlating the GNSS replica for this expected reflected signal after beamforming
  carrying out an accumulation over all the GNSS satellites.

A system according to the invention for detecting, with a receiver satellite in orbit, a target possessing reflective properties that are different from those of the area in which it is found, by GNSS reflectometry, is suitable for implementing the method such as described above.

The invention claimed is:

1. An iterative method for detecting, with at least one receiver satellite in orbit, a target possessing reflective properties that are different from those of an area in which said target is found, by GNSS reflectometry, wherein reflected GNSS signals are received by an active antenna of the receiver satellite comprising a plurality of antenna elements, the method comprising a step of determining assumed positions of the target, for which positions it is desired to detect the target, and, for each assumed position of the target, carrying out the following steps:
  determining a time interval in which said assumed position of the target is visible from the receiver satellite, and dividing this time interval into time segments, for each of which the following steps are carried out:
    determining a direction of arrival of the reflected GNSS signals from said assumed position of the target on the basis of an orbital position of the receiver satellite;
    determining orbital positions of GNSS satellites from their ephemeris data, then the directions of arrival of direct GNSS signals of the GNSS satellites visible to a GNSS receiver of the satellite, and of the disrupting specular-reflection echo of the GNSS signals from the area in which the target is found;
    correlating, for each visible GNSS satellite, the assumed position of the target, in the GNSS code corresponding to this GNSS satellite, and forming beams with the active antenna of the receiver satellite while maximising a gain of the active antenna in the direction of arrival of the signals issued from the assumed position of the target, and while minimising the gain of the active antenna in the directions of arrival of the direct signals of the GNSS satellites visible to the GNSS receiver and of the disrupting specular-reflection echo from said area in which the target is found;
    determining an expected arrival time and an expected variation as a function of time in the arrival phase of GNSS signals potentially reflected from the target, and averaging, over the visible GNSS satellites, a correlation in the GNSS code for the arrival times and variation as a function of time in the arrival phase, on the basis of the orbital position of said receiver satellite and of its variations and of the orbital positions of the GNSS satellites visible from the assumed position of the target and their variations; and
  averaging, over the time segments, said averages of the correlation over the GNSS satellites; and
  determining whether the target is present at the assumed position by comparing said average over the time segments with a reference value.

2. The method according to claim 1, wherein the orbital position of the receiver satellite is determined on the basis of a GNSS receiver placed on said satellite.

3. The method according to claim 1, wherein the reference value of the step of determining whether the target is present is preset.

4. The method according to claim 1, wherein the reference value of the step of determining whether the target is present is adaptive.

5. The method according to claim 1, wherein the target is a ship or boat on a body of water.

6. The method according to claim 1, wherein the target is an area not covered with ice at one of the Earth's poles.

7. A system for detecting, with a satellite in orbit, a target possessing reflective properties that are different from those of an area in which it is found, by GNSS reflectometry, said system being configured to implement the method according to claim 1.

* * * * *